United States Patent
Lu

(10) Patent No.: US 12,256,708 B2
(45) Date of Patent: Mar. 25, 2025

(54) FOLDABLE PET HOUSE

(71) Applicant: XIAMEN SUNNYPET PRODUCTS CO., LTD, Xiamen (CN)

(72) Inventor: Kongzhi Lu, Xiamen (CN)

(73) Assignee: XIAMEN SUNNYPET PRODUCTS CO., LTD, Xiamen (CN)

( * ) Notice: Subject to any disclaimer, the term of this patent is extended or adjusted under 35 U.S.C. 154(b) by 0 days.

(21) Appl. No.: 18/226,838

(22) Filed: Jul. 27, 2023

(65) Prior Publication Data

US 2024/0324549 A1 Oct. 3, 2024

(30) Foreign Application Priority Data

Mar. 27, 2023 (CN) .......................... 202320624277.6
Mar. 27, 2023 (CN) .......................... 202320624280.8

(51) Int. Cl.
*A01K 1/03* (2006.01)

(52) U.S. Cl.
CPC .................................. *A01K 1/033* (2013.01)

(58) Field of Classification Search
CPC ...... A01K 1/035; A01K 1/034; A01K 1/0035; A01K 1/0236; A01K 1/0245; A01K 1/03; A01K 1/031; A01K 1/032; A01K 1/033; A01K 1/0125; A01K 31/08
See application file for complete search history.

(56) References Cited

U.S. PATENT DOCUMENTS

| | | | |
|---|---|---|---|
| 6,216,638 B1 * | 4/2001 | Pivonka | A01K 1/0245 119/498 |
| 10,357,016 B1 * | 7/2019 | Dietz | A01K 1/03 |
| 10,687,510 B2 * | 6/2020 | Lu | A01K 1/034 |
| 12,070,011 B1 * | 8/2024 | Van Vleet | A01K 1/0035 |
| 2005/0145192 A1 | 7/2005 | Axelrod | A01K 1/0245 119/499 |
| 2006/0037554 A1 * | 2/2006 | Axelrod | A01K 31/08 119/499 |
| 2006/0107903 A1 * | 5/2006 | Jin | A01K 1/033 119/499 |
| 2008/0121188 A1 * | 5/2008 | Axelrod | A01K 1/033 119/499 |
| 2011/0247567 A1 * | 10/2011 | Chan | A01K 1/033 119/416 |
| 2019/0239471 A1 * | 8/2019 | Polk | A01K 1/0245 |

(Continued)

FOREIGN PATENT DOCUMENTS

KR 20220143507 A * 10/2022

*Primary Examiner* — Trinh T Nguyen
(74) *Attorney, Agent, or Firm* — Bayramoglu Law Offices LLC

(57) ABSTRACT

A foldable pet house includes a frame composed of a first side panel, a second side panel, a third side panel, and a fourth side panel connected end to end, a top cover connected at a top of the frame, and a bottom panel connected at a bottom of the frame. The first side panel and the third side panel are foldable and opposite to each other, and the second side panel and the fourth side panel are not foldable and opposite to each other. A positioning assembly is provided between the top cover and the top of the frame to limit a relative movement between the frame and the top cover. An opening is provided on the side panel for cleaning. A rotating connector is used for the connection of foldable side panels or other parts and components of the pet house.

6 Claims, 14 Drawing Sheets

(56) References Cited

U.S. PATENT DOCUMENTS

| | | | |
|---|---|---|---|
| 2020/0053977 A1* | 2/2020 | Newman | A01K 1/034 |
| 2021/0392849 A1* | 12/2021 | Stier | A01K 1/0103 |
| 2023/0088045 A1* | 3/2023 | Hoge | A01K 1/0245 |
| | | | 119/496 |
| 2023/0309504 A1* | 10/2023 | Murray | A01K 1/0245 |
| | | | 119/498 |
| 2024/0260536 A1* | 8/2024 | Weber | A01K 1/0125 |

* cited by examiner

FOLDABLE PET HOUSE

CROSS REFERENCE TO THE RELATED APPLICATIONS

This application is based upon and claims priority to Chinese Patent Applications No. 202320624277.6 and No. 202320624280.8, filed on Mar. 27, 2023, the entire contents of which are incorporated herein by reference.

TECHNICAL FIELD

The present disclosure relates to the field of pet utensils, more specifically to a foldable pet house.

BACKGROUND

Conventional foldable pet houses generally focus on the problems of transportation and assembly. To facilitate transportation, the common practice in the art is to reduce the overall product size after assembly by designing the parts and components forming the product into foldable pieces. To simplify assembly of the product before use, the product is usually finalized in an assembled and foldable state before leaving a factory such that no additional connecting parts or the like are required for a user to complete the product assembly before use.

Although some solutions existing in the prior art effectively fix the transportation and assembly issues as mentioned above, they still cannot solve the problems that the existing foldable pet houses are unstable during use, inconvenient for cleaning, prone to cracking at folded portions, and difficult in folding. A conventional foldable pet house is generally kept in the most stable state (i.e., a folded state) for easy transportation, when starting to use it, a user just can unfold it but cannot maintain it in an unfolded state, thus the pet house may be prone to moving and returning to the folded state, resulting in unstability during use. Moreover, since a conventional foldable pet house is always fabricated by formulating multiple foldable components into one piece, connecting or fastening elements may have to be used to connect different foldable components, which causes inconvenience for cleaning due to complicated disassembly and leads to cracking at folded portions due to repeated locking or unlocking of the connecting or fastening elements.

Therefore, it is of great significance to improve the existing foldable pet houses such that they are more stable during use, more convenient for cleaning, firmer and more durable.

SUMMARY

In view of the deficiencies existing in the prior art described above, the objective of the present disclosure is to provide a foldable pet house that is highly stable and durable during use, convenient for cleaning, and easily folded.

The technical solutions of the present disclosure are as follows.

On a first aspect, the present disclosure provides a foldable pet house, which includes a frame composed of a first side panel, a second side panel, a third side panel, and a fourth side panel connected end to end, a top cover connected at a top of the frame, and a bottom panel connected at a bottom of the frame. The first side panel and the third side panel are foldable and opposite to each other, and the second side panel and the fourth side panel are not foldable and opposite to each other. A positioning assembly is provided between the top cover and the top of the frame to limit a relative movement between the frame and the top cover.

Further, each of the first side panel and the third side panel includes a plurality of side plates, adjacent side plates of the plurality of side plates are connected by at least one rotating connector, and the bottom panel is supported on an inner side of the bottom of the frame to position a lower part of the frame. The plurality of side plates connected by rotating connector allows the first side panel and the third side panel to be foldable.

Further, the at least one rotating connector is a two-fold hinge, a four-fold hinge, a combination of the two-fold hinge and the four-fold hinge, or any connecting member that can connect the plurality of side plates.

Further, the positioning assembly includes a first positioning convex column and a first positioning groove. A top surface of each of the first side panel and the third side panel is provided with the first positioning convex column, and a bottom surface of the top cover is provided with the first positioning groove aligned and matched with the first positioning convex column. Alternatively, a top surface of each of the first side panel and the third side panel is provided with the first positioning groove, and a bottom surface of the top cover is provided with the first positioning convex column aligned and matched with the first positioning groove. The cooperation of the first positioning convex column and the first positioning groove assists in limiting the relative movement between the frame and the top cover. When the first positioning convex column and the first positioning groove are engaged, the foldable first side panel and the foldable third side panel cannot move any longer and the frame can be maintained in a stably unfolded state. In this regard, when a pet moves or plays in the pet house or the pet house is moved by an external force, the pet house will not be prone to folding due to the foldable first side panel and the foldable third side panel will be always stable and safe, thus improving safety and use experience.

Further, the first positioning groove is a strip groove extending parallel to a length direction of the first side panel or the third side panel, a length of the strip groove is greater than a diameter of the first positioning convex column, and a width of the strip groove is equivalent to the diameter of the first positioning convex column. The strip groove is configured to have a length greater than the diameter of the first positioning convex column, such than the first positioning convex column can be safely and easily aligned with and received by the strip groove, thus facilitating and simplifying the process of closing the top cover on the frame.

Alternatively, the first positioning groove is a groove with any shape with the overall dimension slightly larger than the overall dimension of the first positioning convex column, as long as the first positioning convex column can easily enter the groove when closing the top cover.

Further, the positioning assembly further includes a second positioning convex column and a second positioning groove. The second side panel or the fourth side panel is provided with the second positioning convex column and a bottom surface of the top cover is provided with the second positioning groove aligned and matched with the second positioning convex column. Alternatively, the second side panel or the fourth side panel is provided with the second positioning groove and a bottom surface of the top cover is provided with the second positioning convex column aligned and matched with the second positioning groove. The addition of the second positioning convex column and the second positioning groove can strengthen the stability of the pet house during use, along with the first positioning convex column and the first positioning groove.

Further, the positioning assembly includes two positioning pieces. The two positioning pieces are provided at two ends of a bottom surface of the top cover, and the two positioning pieces are configured to abut against inner surfaces or outer surfaces of the first side panel and the third side panel when the top cover seals the frame. The close contact between the two positioning pieces and the inner surfaces or the outer surfaces of the foldable first side panel and the foldable third side panel prevents the foldable first side panel and the foldable third side panel from moving relative to the top cover, allows the first side panel and the third side panel to be limited in a completely unfolded stated, and ensures the safety and stability of the foldable pet house during use.

Further, each of the two positioning pieces is a positioning convex bar, a plurality of spacing arranged positioning convex blocks, a combination of the positioning convex bar and the spacing arranged positioning convex blocks, or any element capable of abutting against the inner surfaces or the outer surfaces of the first side panel and the third side panel when the top cover seals the frame.

Further, each of the adjacent side plates is provided with a notch groove, and two notch grooves on the adjacent side plates form an open groove for a hand to hold the frame. With the open groove, the pet house is convenient to be held by a user when the pet house is in a completely unfolded state and moved to different places as needed.

Further, the top cover is connected to a top surface of the second side panel or the fourth side panel through a flipping connector.

On a second aspect, the present disclosure provides a foldable pet house, which includes a frame composed of a first side panel, a second side panel, a third side panel, and a fourth side panel connected end to end, a top cover connected at a top of the frame, and a bottom panel connected at a bottom of the frame. The first side panel and the third side panel are foldable and opposite to each other, and the second side panel and the fourth side panel are not foldable and opposite to each other. An opening is provided on the second side panel or the fourth side panel, a length of the opening is four fifths or more of a length of the second side panel or the fourth side panel, and a bottom of the opening is flush with a top surface of the bottom panel. The opening is designed to have a length of four fifths or more the length of the second side panel or the fourth side panel and the bottom of the opening is flush with the top surface of the bottom panel, which is conducive to cleaning. The existing pet houses generally only have one pet entrance and exit that is usually small. When cleaning the interior of the pet house especially the cat litter tray inside, the top cover always has to be opened and the waste can be removed only from the top of the pet house, which is not only inconvenient for operation, but also difficult to thoroughly sweep out the dust from the bottom panel. Moreover, when the cat litter tray is removed, due to the fact that the area of the cat litter tray is usually slightly smaller than the area of the bottom panel, the cat litter tray can easily touch the inner wall of the pet house and lose balance when being lifted from the bottom panel, resulting in the cat litter scattering inside the pet house and increasing the cleaning work. However, with the design of the present disclosure, the additional opening on the side panel with enough large size and its bottom flush with the bottom panel allows a user to clean the interior of the pet house from the side and pull out the cat litter tray directly and horizontally from the opening, thus facilitating the cleaning process.

Further, one or more door panels are provided on the second side panel or the fourth side panel and configured to cover the opening and open outward at an angle of not less than 90°, and one of the door panels is provided with a pet entrance and exit.

Further, each of the one or more door panels is connected to the second side panel or the fourth side panel through at least one first rotating connector.

Further, two end faces of the first side panel are respectively connected to an inner wall of the second side panel and an inner wall of the fourth side panel through second rotating connectors, and two end faces of the third side panel are respectively connected to the inner wall of the second side panel and the inner wall of the fourth side panel through third rotating connectors.

Further, each of the first side panel and the third side panel includes a plurality of side plates, and adjacent side plates of the plurality of side plates are connected by at least one fourth rotating connector.

Further, each of the at least one first rotating connector, the second rotating connectors, the third rotating connectors, and the at least one fourth rotating connector is a two-fold hinge, a four-fold hinge, a combination of the two-fold hinge and the four-fold hinge, or any similar connecting member.

Further, a bottom inner side of each of the second side panel and the fourth side panel are provided with support members, and the bottom panel is detachably supported on the support members to enable the bottom of the opening to be flush with the top surface of the bottom panel.

On a third aspect, the present disclosure provides a foldable pet house, which includes a frame composed of a first side panel, a second side panel, a third side panel, and a fourth side panel connected end to end, a top cover connected at a top of the frame, and a bottom panel connected at a bottom of the frame. The first side panel and the third side panel are foldable and opposite to each other, and the second side panel and the fourth side panel are not foldable and opposite to each other. Each of the first side panel and the third side panel includes a plurality of side plates, and adjacent side plates of the plurality of side plates are connected by at least one rotating connector. Bottoms of the first side panel and the third side panel are configured at a plane higher than bottoms of the second side panel and the fourth side panel, which is convenient for folding because the bottoms of the foldable first and third side panels will not abut against or forced by the bottoms of the second and fourth side panels after folded.

Further, the at least one rotating connector is a two-fold hinge, a four-fold hinge, a combination of the two-fold hinge and the four-fold hinge, or any connecting member that can connect the plurality of side plates.

Further, the adjacent side plates include a first side plate and a second side plate adjacent to each other. When the at least one rotating connector is the four-fold hinge, a first fixing surface of the four-fold hinge is fixed on an inner wall of the first side plate, a second fixing surface of the four-fold hinge is fixed on an inner wall of the second side plate, and the inner wall of the first side plate and the inner wall of the second side plate are configured to contact each other when the frame is unfolded; a first locking surface of the four-fold hinge is locked on an inner surface of the first side plate, a second locking surface of the four-fold hinge is locked on an inner surface of the second side plate, and the inner surface of the first side plate and the inner surface of the second side plate are configured to face an interior of the frame when the frame is unfolded.

Further, the first locking surface and the second locking surface of the four-fold hinge are locked by fasteners or similar locking elements.

The four-fold hinge used allows the two locking surfaces to expose outside the side panels when in a completely unfolded state, when the foldable side plates need to be locked or unlocked, an operator can perform operations directly on the exposed inner surfaces of the side panels without the need of turning around the side plates, thus enhancing the efficiency and simplifying the operation. Moreover, since the side plates are generally thin, the inner walls of the side plates contacting each other when in a completely unfolded state have very limited space to hold the first and second fixing surfaces of the four-fold hinge. Fixing the first and second fixing surfaces of the four-fold hinge on the inner walls of the side plates avoids any locking or unlocking operation on the narrow inner walls of the side plates, thus preventing the folded portions from cracking caused by frequently locking or unlocking operation and prolonging the service life of the pet house.

Further, an opening is provided on the second side panel or the fourth side panel, a bottom of the opening is higher than bottoms of the second side panel and the fourth side panel, and the bottoms of the first side panel and the third side panel are configured to be flush with the bottom of the opening.

On a fourth aspect, the present disclosure provides a foldable pet house which differs from the above foldable pet house in that either or both of the second side panel and the fourth side panel are foldable. The second side panel and/or the fourth side panel include(s) a plurality of side plates that are connected by at least one rotating connector.

The Present Disclosure has the Following Advantages:
1. The foldable pet house with the positioning assembly can prevent the foldable side panels from moving towards the folding direction during pet activities or external force application, thus improving the stability and safety of the foldable pet house. Furthermore, the design of the positioning convex column and the positioning groove having a larger overall dimension than the positioning convex column allows a rapid and safe engagement and receipt of the positioning convex column into the positioning groove, facilitating the process of closing the top cover and limiting the foldable side panels.
2. The foldable pet house with an additional opening on the side panel is significantly convenient for cleaning the interior of the pet house. The opening is large enough and the bottom thereof is flush with the bottom panel, which allows a user to remove all waste in the pet house from the opening on the side panel and to pull out a cat litter tray directly and horizontally from the opening even with a small force.
3. The foldable pet house with a four-fold hinge used and the bottoms of foldable side panels higher than the bottoms of the rest two side panels is conducive to production and prolong the service life of the pet house. The bottoms of foldable side panels are arranged at a plane higher than the bottoms of the rest two side panels, which can facilitate folding because the bottoms of the foldable side panels will not abut against or forced by the bottoms of the rest two side panels after folded. The four-fold hinge used allows the two locking surfaces to expose outside the foldable side panels when in a completely unfolded state, when the foldable side plates need to be locked or unlocked, an operator can perform operations directly on the exposed inner surfaces of the side panels without the need of turning around the side plates, thus enhancing the efficiency and simplifying the operation. Moreover, since the side plates are generally thin, the inner walls of the side plates contacting each other when in a completely unfolded state have very limited space to hold the first and second fixing surfaces of the four-fold hinge. Fixing the first and second fixing surfaces of the four-fold hinge on the inner walls of the side plates avoids any locking or unlocking operation on the narrow inner walls of the side plates, thus preventing the folded portions from cracking caused by frequently locking or unlocking operation and prolonging the service life of the pet house.

Figure 1:
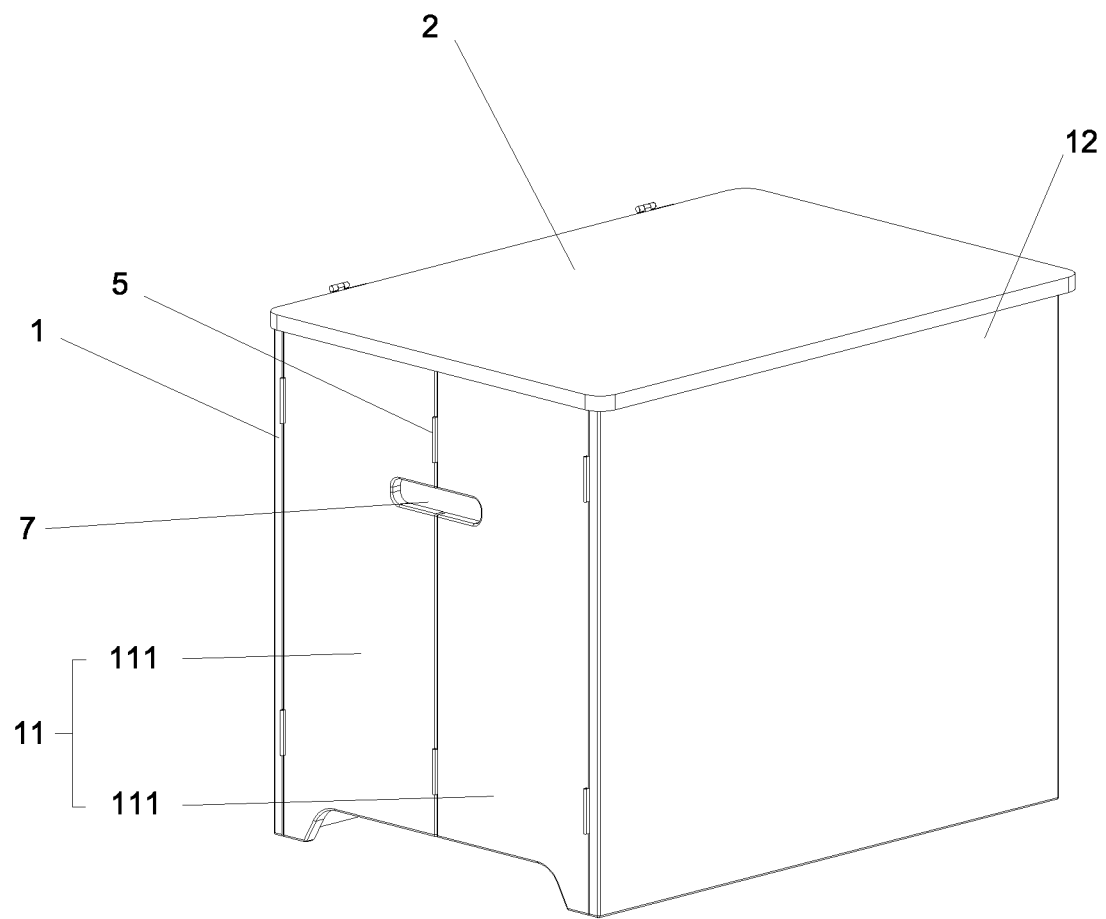
FIG. 1 is a left perspective view of the foldable pet house according to Embodiment 1 of the present disclosure.

In the drawings:
1. frame, 11. first side panel, 12. second side panel, 13. third side panel, 14. fourth side panel, 111. side plate, 1111. notch groove, 121. side plate, 122. opening, 1211. door panel, 12111. pet entrance and exit, 131. side plate, 141. side plate, 2. top cover, 3. bottom panel, 4.

positioning assembly, 41. first positioning convex column, 42. first positioning groove, 43. second positioning convex column, 44. second positioning groove, 45. positioning piece, 5. rotating connector, 6. flipping connector, 7. open groove, 8. first rotating connector, 9. fixing mechanism, 91. iron sheet, 92. magnet, 15. third rotating connector, 16. fourth rotating connector, 120. support member, 140. support member, 111a. first side plate, 111b. second side plate, 51. first fixing surface, 52. second fixing surface, 53, first locking surface, 54. second locking surface, 57. fastener.

DETAILED DESCRIPTION OF THE EMBODIMENTS

The present disclosure is described in detail below with reference to embodiments. The following embodiments are intended to help those skilled in the art to further understand the present disclosure, but do not limit the present disclosure in any way. It should be noted that those of ordinary skill in the art can further make several modifications and improvements without departing from the concept of the present disclosure. These all fall within the protection scope of the present disclosure.

For the convenience of the explanation of the embodiments, the term "inner" mentioned below refers to the direction towards the internal center of the frame, and the term "outer" or "outward" refers to the direction deviating from the internal center of the frame.

Embodiment 1

Figure 2:
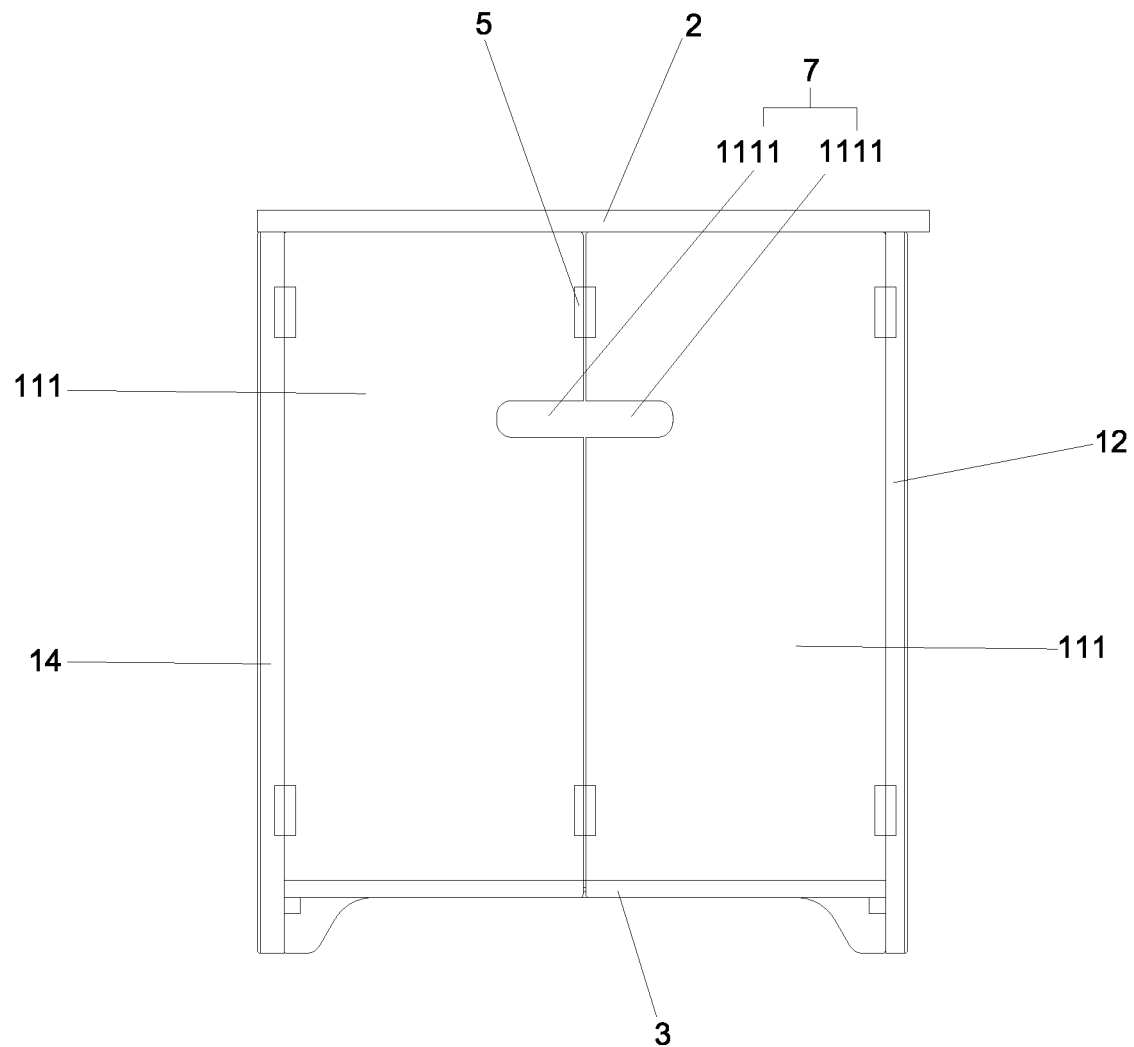
FIG. 2 is a left plan view of the foldable pet house shown in FIG. 1.
Figure 3:
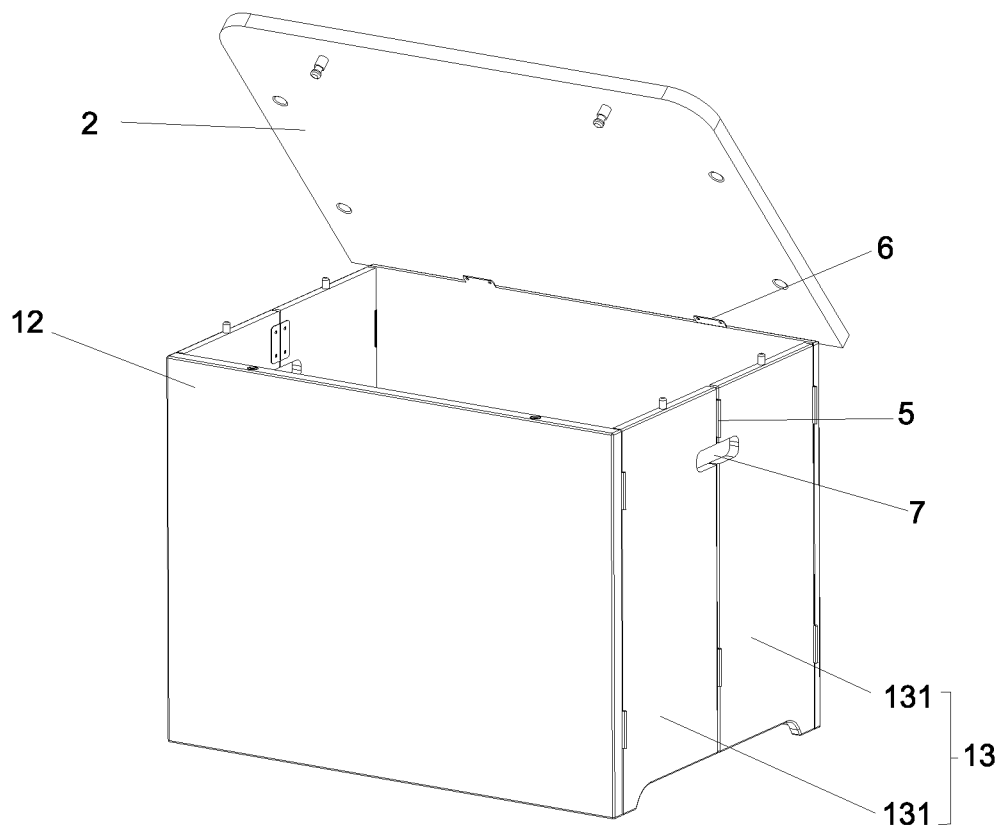
FIG. 3 is a right perspective view of the foldable pet house shown in FIG. 1 with the top cover opened.

Referring to FIG. 1 to FIG. 3, the present embodiment provides a foldable pet house, which includes the frame 1 composed of the first side panel 11, the second side panel 12, the third side panel 13, and the fourth side panel 14 connected end to end, the top cover 2 connected at a top of the frame 1, and the bottom panel 3 connected at a bottom of the frame 1. The first side panel 11 and the third side panel 13 are foldable and opposite to each other, and the second side panel 12 and the fourth side panel 14 are not foldable and opposite to each other. The positioning assembly 4 is provided between the top cover 2 and the top of the frame 1 to limit a relative movement between the frame 1 and the top cover 2.

The first side panel 11 includes a plurality of side plates 111, and the third side panel 13 includes a plurality of side plates 131. Adjacent side plates 111 or adjacent side plates 131 are connected by at least one rotating connector 5, and the bottom panel 3 is supported on an inner side of the bottom of the frame 1 to position a lower part of the frame 1. The plurality of side plates 111 and the plurality of side plates 131 connected by the rotating connector 5 allow the first side panel 11 and the third side panel 13 to be foldable.

The at least one rotating connector 5 can be a two-fold hinge, a four-fold hinge, a combination of the two-fold hinge and the four-fold hinge, or any connecting member that can connect the plurality of side plates 111/131.

Figure 4:
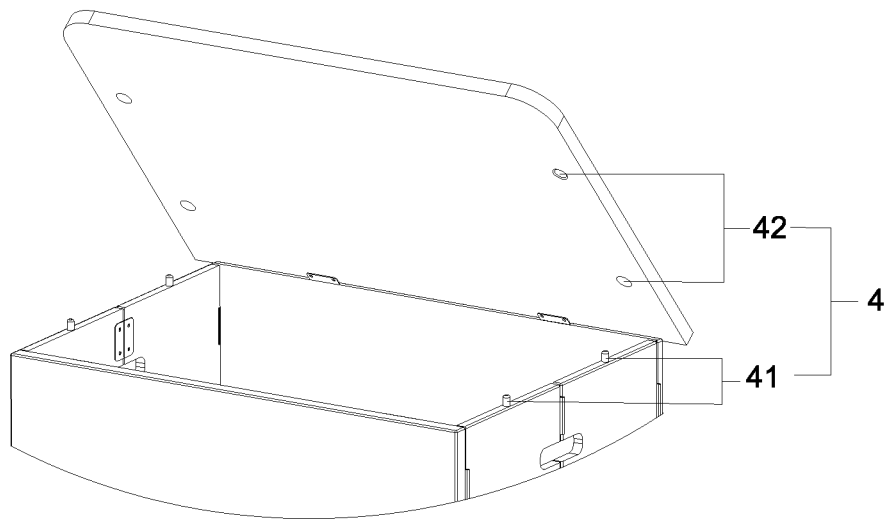
FIG. 4 is a first partial view of the foldable pet house showing the positioning assembly.
Figure 5:
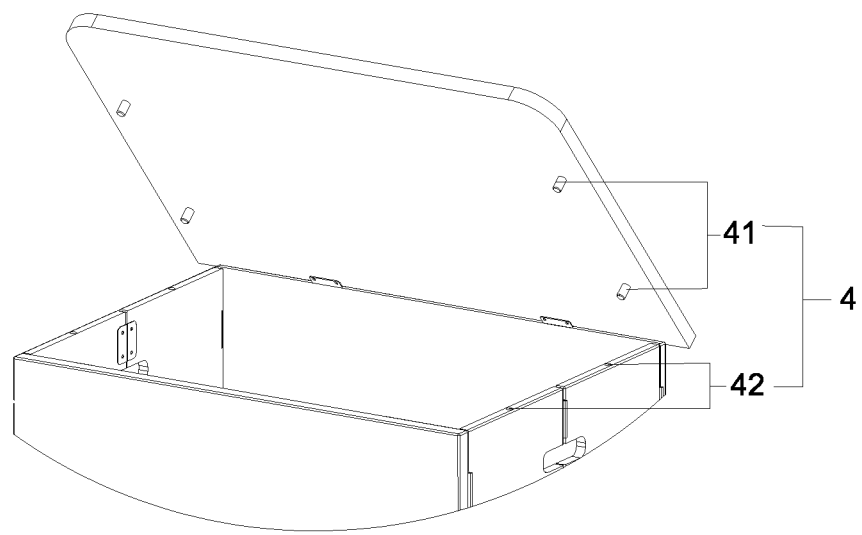
FIG. 5 is a second partial view of the foldable pet house showing the positioning assembly.

Referring to FIG. 4 to FIG. 5, the positioning assembly 4 includes the first positioning convex column 41 and the first positioning groove 42. A top surface of each of the first side panel 11 and the third side panel 13 is provided with the first positioning convex column 41, and a bottom surface of the top cover 2 is provided with the first positioning groove 42 aligned and matched with the first positioning convex column 41. Alternatively, a top surface of each of the first side panel 11 and the third side panel 13 is provided with the first positioning groove 42, and a bottom surface of the top cover 2 is provided with the first positioning convex column 41 aligned and matched with the first positioning groove 42. The cooperation of the first positioning convex column 41 and the first positioning groove 42 assists in limiting the relative movement between the frame 1 and the top cover 2. When the first positioning convex column 41 and the first positioning groove 42 are engaged, the foldable first side panel 11 and the foldable third side panel 13 cannot move any longer and the frame 1 can be maintained in a stably unfolded state. In this regard, when a pet moves or plays in the pet house or the pet house is moved by an external force, the pet house will not be prone to folding due to the foldable first side panel 11 and the foldable third side panel 13 will be always stable and safe, thus improving safety and use experience.

The first positioning convex column 41 is a cylindrical structure. Of course, in other embodiments, the first positioning convex column 41 can also be a convex boss, a rectangle, a regular polygon, an irregular polygon structure, or the like.

The first positioning groove 42 is a strip groove extending parallel to a length direction of the first side panel 11 or the third side panel 13, a length of the strip groove is greater than a diameter of the first positioning convex column 41, and a width of the strip groove is approximately equal to the diameter of the first positioning convex column 41. The strip groove is configured to have a length greater than the diameter of the first positioning convex column 41, such than the first positioning convex column 41 can be safely and easily aligned with and received by the strip groove, thus facilitating and simplifying the process of closing the top cover on the frame.

Alternatively, the first positioning groove 42 is a groove in any shape with the overall dimension slightly larger than the overall dimension of the first positioning convex column 41, as long as the first positioning convex column 41 can easily enter the groove when closing the top cover 2.

Figure 6:
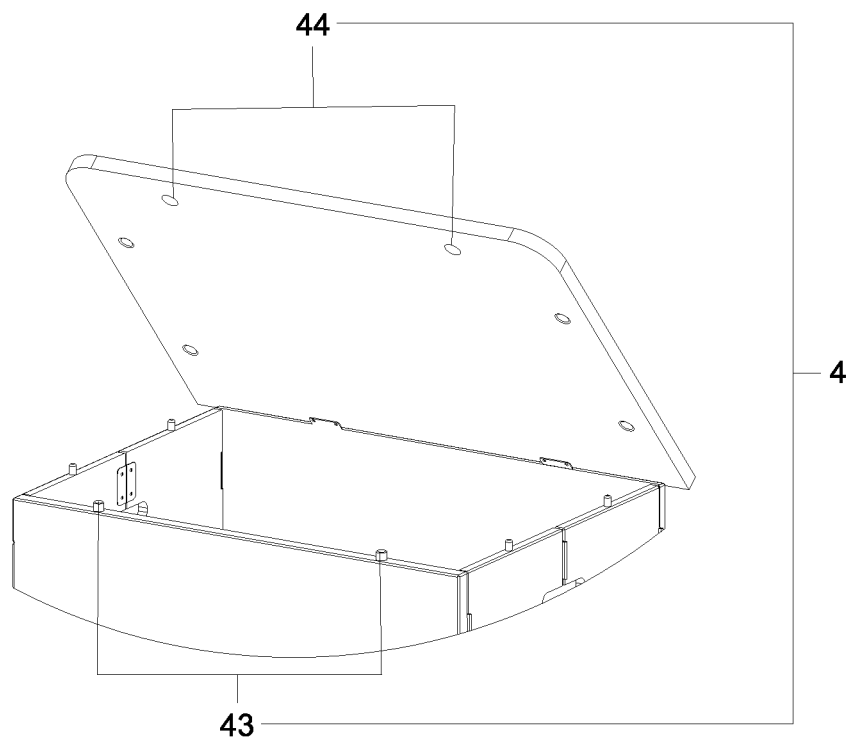
FIG. 6 is a third partial view of the foldable pet house showing the positioning assembly.

Referring to FIG. 6, the positioning assembly 4 further includes a second positioning convex column 43 and a second positioning groove 44. The second side panel 12 or the fourth side panel 14 is provided with the second positioning convex column 43 and a bottom surface of the top cover 2 is provided with the second positioning groove 44 aligned and matched with the second positioning convex column 43. Alternatively, the second side panel 12 or the fourth side panel 14 is provided with the second positioning groove 44 and a bottom surface of the top cover 2 is provided with the second positioning convex column 43 aligned and matched with the second positioning groove 44. The addition of the second positioning convex column 43 and the second positioning groove 44 can strengthen the stability of the pet house during use, along with the first positioning convex column 41 and the first positioning groove 42.

The top cover 2 is connected to a top surface of the second side panel 12 or the fourth side panel 14 through the flipping connector 6.

Each of the adjacent side plates 111/131 is provided with the notch groove 1111/1131, and two notch grooves 1111/1131 on the adjacent side plates 111/131 form the open groove 7 for a hand to hold the frame 1. With the open groove 7, the pet house is convenient to be held by a user when the pet house is in a completely unfolded state and moved to different places as needed.

Embodiment 2

The present embodiment differs from Embodiment 1 only in the structure of the positioning assembly 4. In the present embodiment, referring to FIG. 7 to FIGS. 8A-8B, the positioning assembly 4 includes two positioning pieces 45. The two positioning pieces 45 are provided at two ends of a bottom surface of the top cover 2, and the two positioning pieces 45 are configured to abut against inner surfaces or outer surfaces of the first side panel 11 and the third side panel 13 when the top cover 2 seals the frame 1. The close contact between the two positioning pieces 45 and the inner surfaces or the outer surfaces of the foldable first side panel 11 and the foldable third side panel 13 prevents the foldable first side panel 11 and the foldable third side panel 13 from moving relative to the top cover 2, allows the first side panel 11 and the third side panel 13 to be limited in a completely unfolded state, and ensures the safety and stability of the foldable pet house during use.

Figure 7:
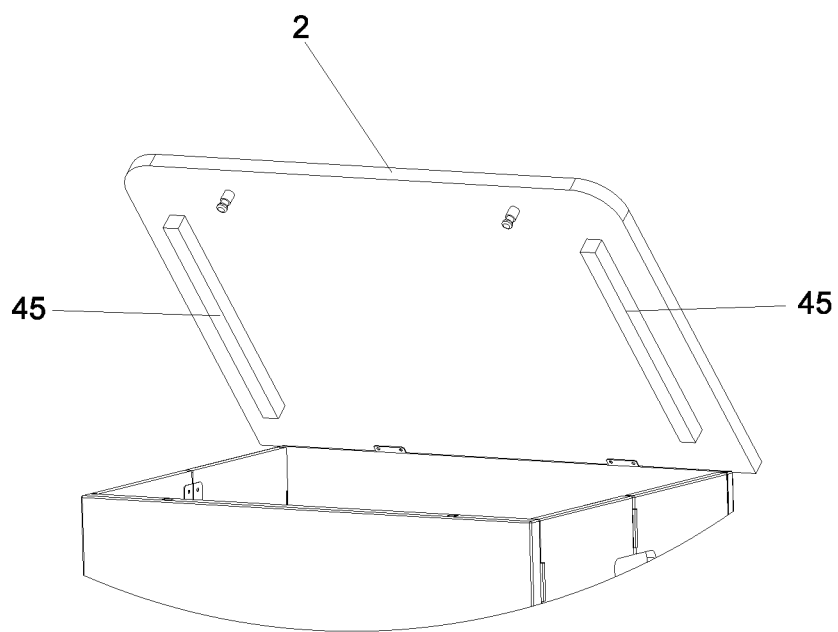
FIG. 7 is a fourth partial view of the foldable pet house showing the positioning assembly.
Figure 8A:
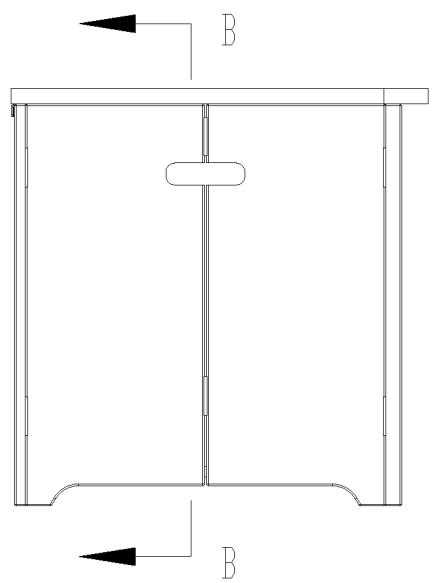
FIG. 8A is a left plane view of the foldable pet house shown in FIG. 7.
Figure 8B:
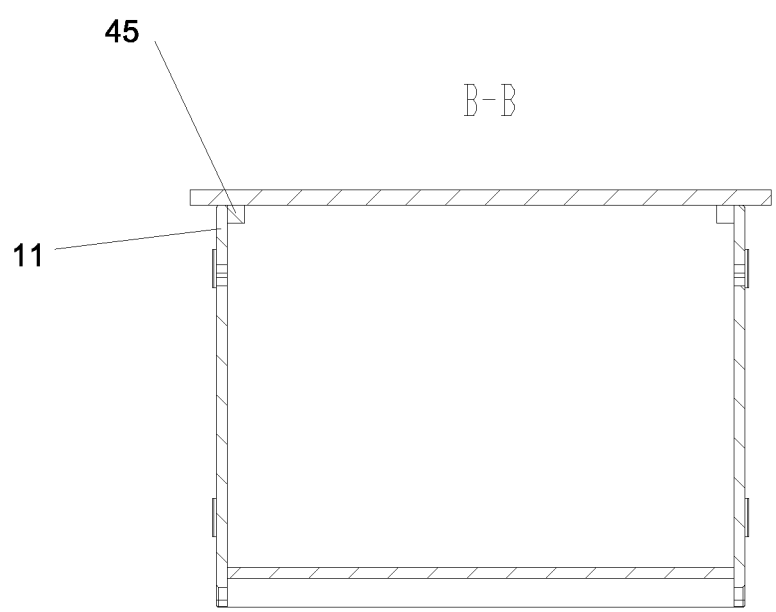
FIG. 8B is a cross-sectional view taken from the line B-B in FIG. 8A.
Figure 9:
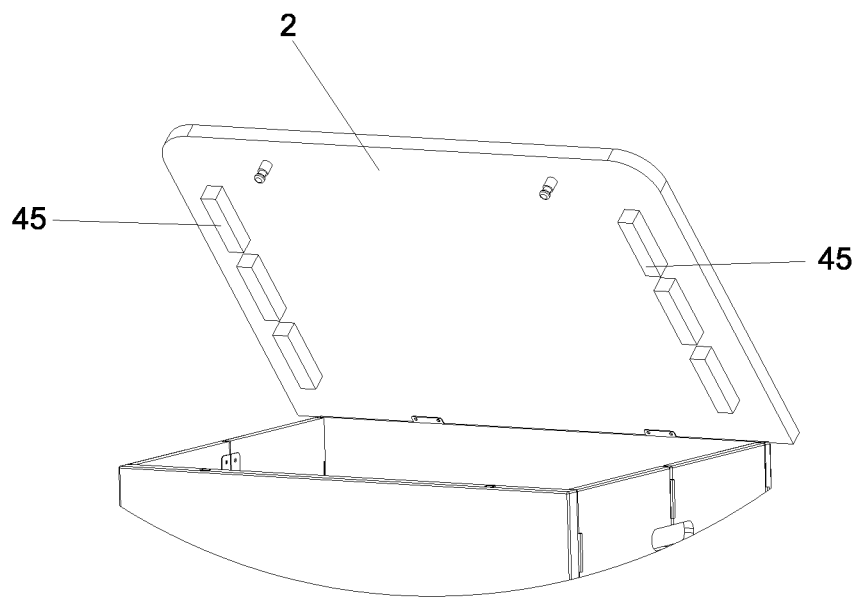
FIG. 9 is a fifth partial view of the foldable pet house showing the positioning assembly.

Referring to FIG. 7 and FIG. 9, each of the two positioning pieces 45 can be a positioning convex bar, a plurality of spacing arranged positioning convex blocks, a combination of the positioning convex bar and the spacing arranged positioning convex blocks, or any element capable of abutting against the inner surfaces or the outer surfaces of the first side panel 11 and the third side panel 13 when the top cover 2 seals the frame 1.

Embodiment 3

Figure 10:
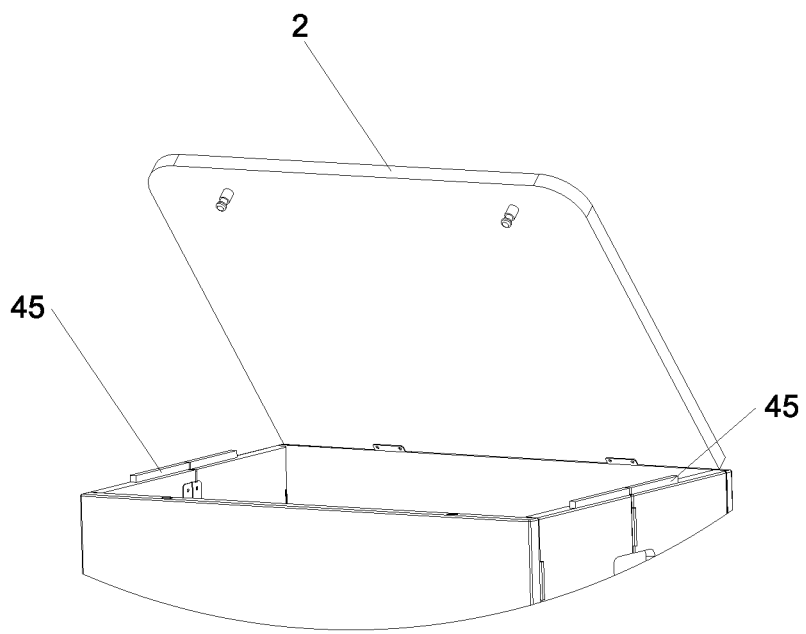
FIG. 10 is a sixth partial view of the foldable pet house showing the positioning assembly.

The present embodiment differs from Embodiment 1 only in the structure of the positioning assembly 4. In the present embodiment, referring to FIG. 10, the positioning assembly 4 includes two positioning pieces 45. The two positioning pieces 45 are provided at the top of the first side panel 11 and the top of the third side panel 13, and the two positioning pieces 45 are configured to abut against outer edges of the top cover 2 when the top cover 2 seals the frame 1. The close contact between the two positioning pieces 45 and the outer edges of the top cover 2 prevents the foldable first side panel 11 and the foldable third side panel 13 from moving relative to the top cover 2, allows the first side panel 11 and the third side panel 13 to be limited in a completely unfolded state, and ensures the safety and stability of the foldable pet house during use.

Each of the two positioning pieces 45 can be a positioning convex sheet, a positioning convex bar, a plurality of spacing arranged positioning convex blocks, a combination thereof, or any element capable of abutting against the outer edges of the top cover 2 when the top cover 2 seals the frame 1.

Embodiment 4

Figure 11:
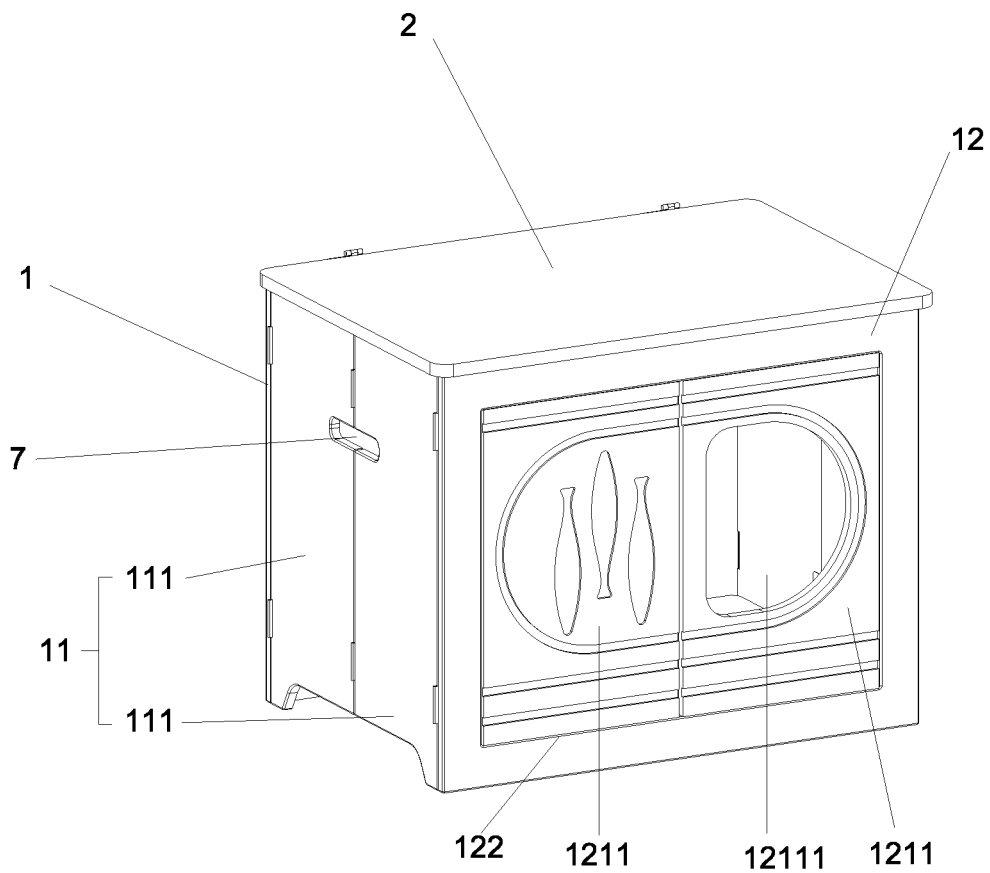
FIG. 11 is a left perspective view of the foldable pet house according to Embodiment 4 of the present disclosure.
Figure 12:
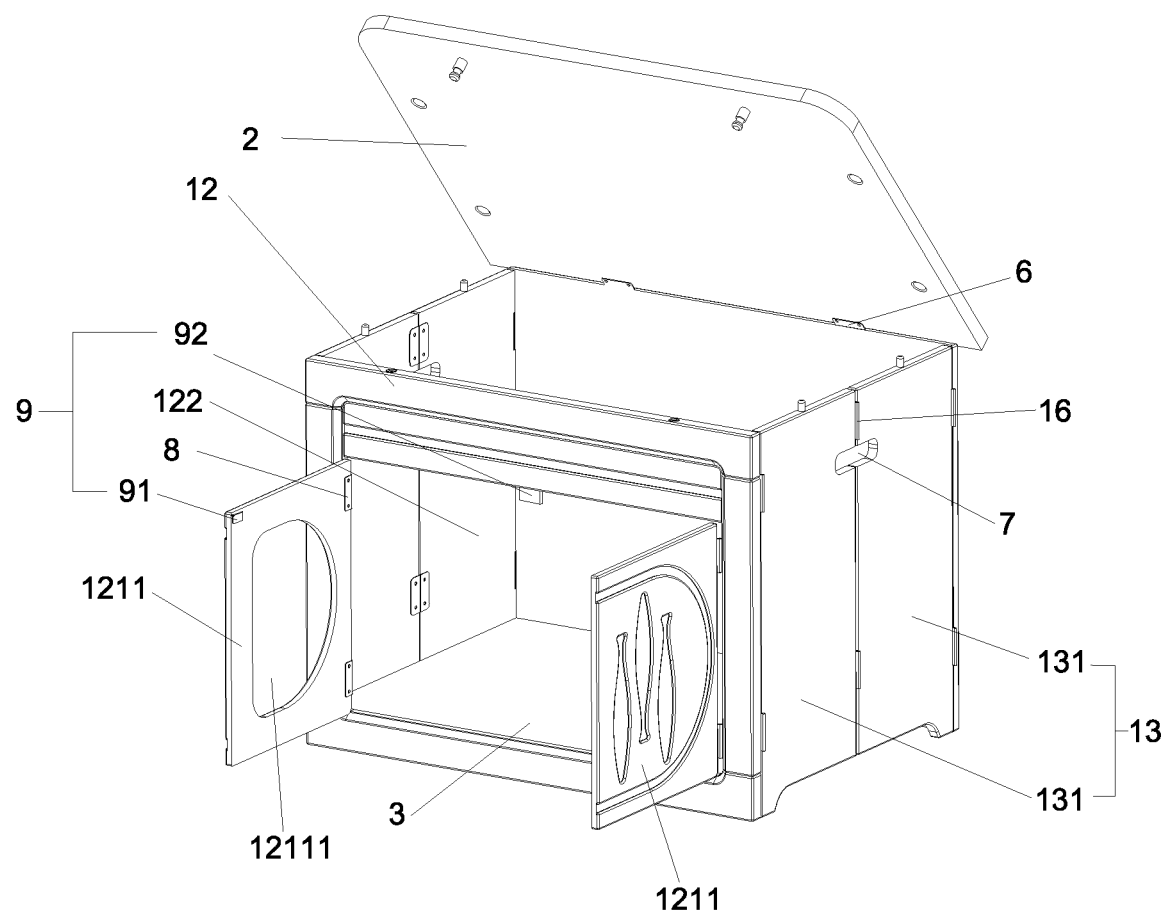
FIG. 12 is a right perspective view of the foldable pet house shown in FIG. 11 with the top cover and the door panels opened.
Figure 13:
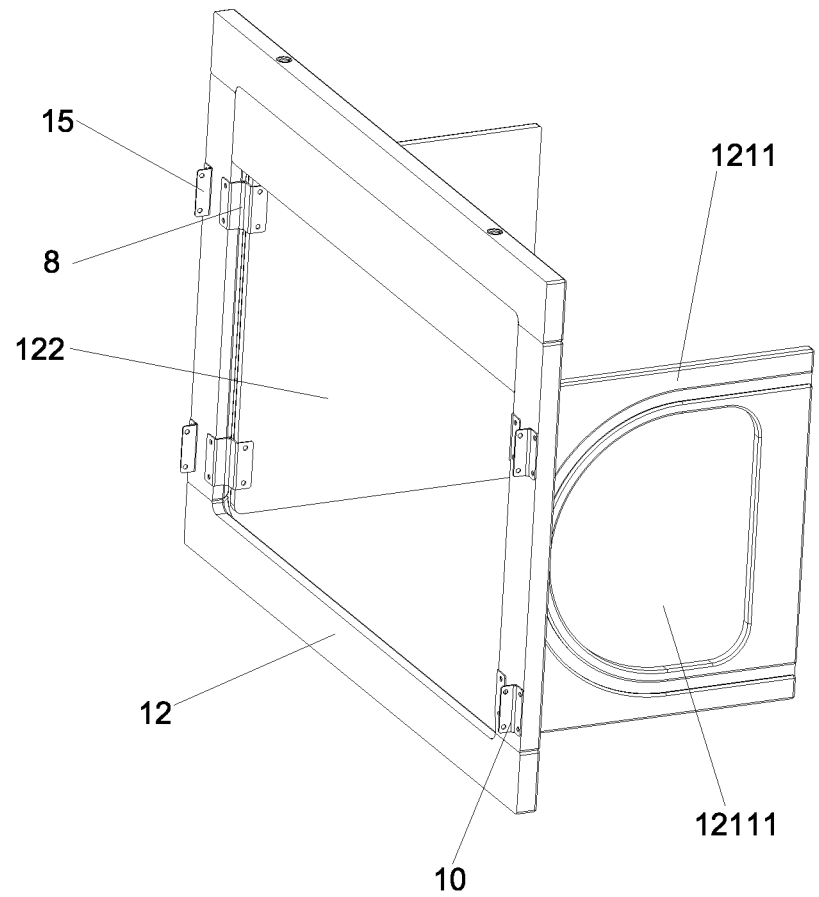
FIG. 13 is a schematic diagram showing the connection between the side panel and the door panels of the foldable pet house according to Embodiment 4 of the present disclosure.

Referring to FIG. 11 to FIG. 13, the present embodiment provides a foldable pet house, which includes the frame 1 composed of the first side panel 11, the second side panel 12, the third side panel 13, and the fourth side panel 14 connected end to end, the top cover 2 connected at a top of the frame 1, and the bottom panel 3 connected at a bottom of the frame 1. The first side panel 11 and the third side panel 13 are foldable and opposite to each other, and the second side panel 12 and the fourth side panel 14 are not foldable and opposite to each other. The opening 122 is provided on the second side panel 12 or the fourth side panel 14, a length of the opening 122 is about four fifths or more of a length of the second side panel 12 or the fourth side panel 14, or the length of the opening 122 is large enough for a pet to enter and exit the pet house and to be able to remove waste from the pet house, and a bottom of the opening 122 is flush with a top surface of the bottom panel 3. The opening 122 is designed to have a length of four fifths or more the length of the second side panel 12 or the fourth side panel 14 and the bottom of the opening 122 is flush with the top surface of the bottom panel 3, which is conducive to cleaning. The existing pet houses generally only have one pet entrance and exit that is usually small. When cleaning the interior of the pet house especially the cat litter tray inside, the top cover 2 always has to be opened and the waste can be removed only from the top of the pet house, which is not only inconvenient for operation, but also difficult to thoroughly sweep out the dust from the bottom panel 3. Moreover, when the cat litter tray is removed, due to the fact that the area of the cat litter tray is usually slightly smaller than the area of the bottom panel 3, the cat litter tray can easily touch the inner wall of the pet house and lose balance when being lifted from the bottom panel 3, resulting in the cat litter scattering inside the pet house and increasing the cleaning work. However, with the design of the present disclosure, the additional opening 122 on the side panel with enough large size and its bottom flush with the bottom panel 3 allows a user to clean the interior of the pet house from the side and pull out the cat litter tray directly and horizontally from the opening 122, thus facilitating the cleaning process.

One or more door panels 1211 are provided on the second side panel 12 or the fourth side panel 14 and configured to cover the opening 122 and open outward at an angle of not less than 90°, and one of the door panels 1210 is provided with a pet entrance and exit 12111.

Each of the one or more door panels 1211 is connected to the second side panel 12 or the fourth side panel 14 through at least one first rotating connector 8.

When two door panels 1211 are provided, the two door panels 1211 are symmetrically connected on both sides of the opening 122, forming a double-door structure. Each door panel 1211 includes a rotating connection end and a movable end, the rotating connection end is connected to the second side panel 12 corresponding to the side wall of one end of the opening 122 through the first rotating connector 8, and the movable end is detachably connected to the second side panel 12 through the fixing mechanism 9.

The fixing mechanism 9 includes the iron sheet 91 and a magnet 92. The magnet 92 is fixed on the second side panel 12 corresponding to the middle of the top of the opening 122, and the iron sheet 91 is fixed on the inner wall of the movable end of each door panel 1211. The cooperation of the magnet 92 and the iron sheet 91 allows the door panel 1211 to fix on the second side panel 12.

Two end faces of the first side panel 11 are respectively connected to an inner wall of the second side panel 12 and an inner wall of the fourth side panel 14 through second rotating connectors 10, and two end faces of the third side panel 13 are respectively connected to the inner wall of the second side panel 12 and the inner wall of the fourth side panel 14 through third rotating connectors 15.

Further, the first side panel 11 includes a plurality of side plates 111, and the third side panel 13 includes a plurality of side plates 131. Adjacent side plates 111 or adjacent side plates 131 are connected by at least one fourth rotating connector 16.

Each of the at least one first rotating connector 8, the second rotating connectors 10, the third rotating connectors 15, and the at least one fourth rotating connector 16 can be a two-fold hinge, a four-fold hinge, a combination of the two-fold hinge and the four-fold hinge, or any similar connecting member.

Figure 14:
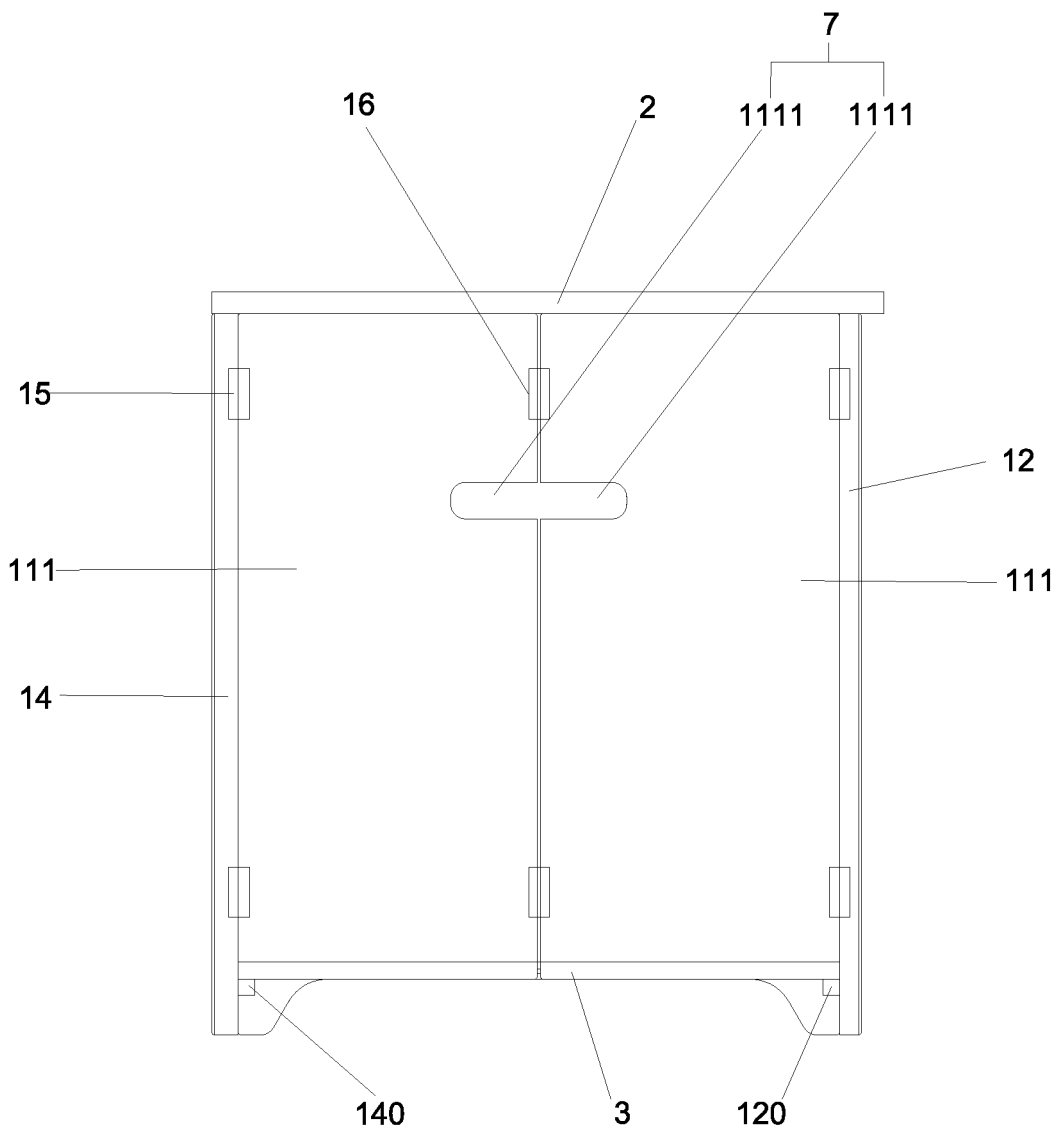
FIG. 14 is a left plan view of the foldable pet house shown in FIG. 11.
Figure 15:
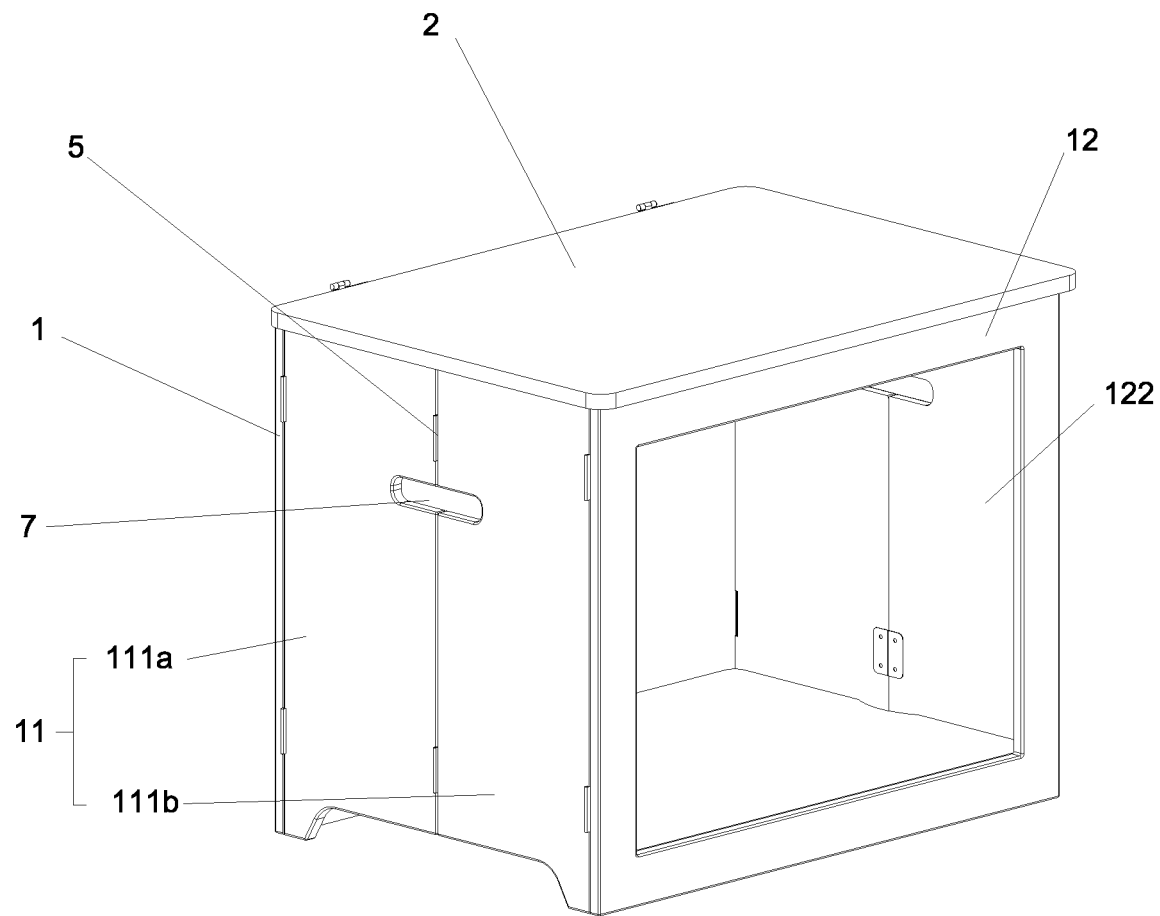
FIG. 15 is a left perspective view of the foldable pet house according to Embodiment 5 of the present disclosure.
Figure 16A:
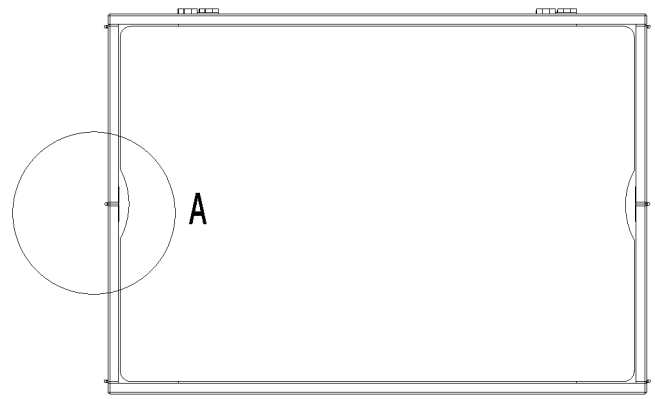
FIG. 16A is a bottom plan view of the foldable pet house shown in FIG. 15.
Figure 16B:
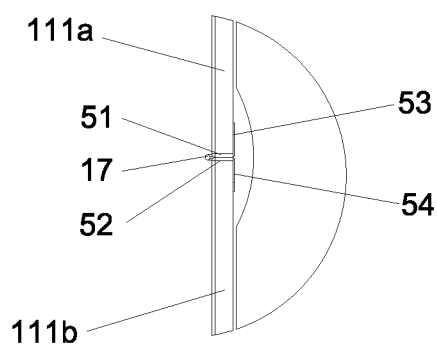
FIG. 16B is a partially enlarged view showing the part A in FIG. 16A.
Figure 17:
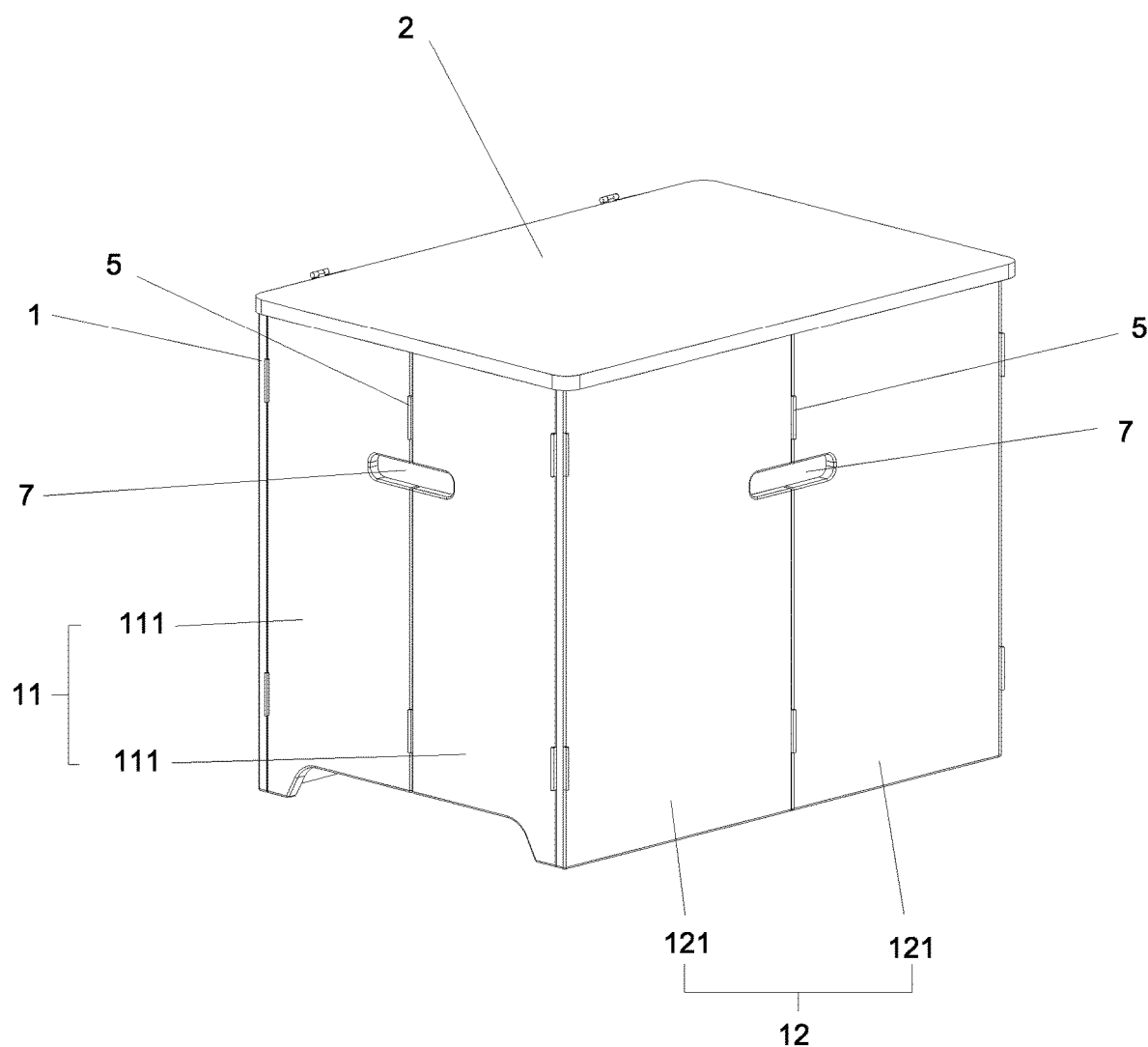
FIG. 17 is a left perspective view of the foldable pet house according to Embodiment 6 of the present disclosure.

Referring to FIG. 14, a bottom inner side of the second side panel 12 are provided with support members 120, and a bottom inner side of the fourth side panel 14 are provided with support members 140, and the bottom panel 3 is detachably supported on the support members 120 and 140 to enable the bottom of the opening 122 to be flush with the top surface of the bottom panel 3. The support members 120/140 are preferably support bars. The bottom panel 3 supported on the support bars is easily removed from the pet house for deep cleaning.

Embodiment 5

Referring to FIG. 15 to FIGS. 16A-16B, the present embodiment provides a foldable pet house, which includes the frame 1 composed of the first side panel 11, the second side panel 12, the third side panel 13, and the fourth side panel 14 connected end to end, the top cover 2 connected at a top of the frame 1, and the bottom panel 3 connected at a bottom of the frame 1. The first side panel 11 and the third side panel 13 are foldable and opposite to each other, and the second side panel 12 and the fourth side panel 14 are not foldable and opposite to each other. The first side panel 11 includes a plurality of side plates 111, and the third side panel 13 includes a plurality of side plates 131. Adjacent side plates 111 or adjacent side plates 131 are connected by at least one rotating connector 5. Bottoms of the first side panel 11 and the third side panel 13 are configured at a plane higher than bottoms of the second side panel 12 and the fourth side panel 14, which is convenient for folding because the bottoms of the foldable first and third side panels will not abut against or forced by the bottoms of the second and fourth side panels after folded.

The at least one rotating connector 5 can be a two-fold hinge, a four-fold hinge, a combination of the two-fold hinge and the four-fold hinge, or any connecting member that can connect the plurality of side plates.

The adjacent side plates 111 are the first side plate 111*a* and the second side plate 111*b* adjacent to each other. When the at least one rotating connector 5 is the four-fold hinge, the first fixing surface 51 of the four-fold hinge is fixed on an inner wall of the first side plate 111*a*, the second fixing surface 52 of the four-fold hinge is fixed on an inner wall of the second side plate 111*b*, and the inner wall of the first side plate 111*a* and the inner wall of the second side plate 111*b* are configured to contact each other when the frame 1 is unfolded; the first locking surface 53 of the four-fold hinge is locked on an inner surface of the first side plate 111*a*, the second locking surface 54 of the four-fold hinge is locked on an inner surface of the second side plate 111*b*, and the inner surface of the first side plate 111*a* and the inner surface of the second side plate 111*b* are configured to face an interior of the frame 1 when the frame 1 is unfolded.

The first locking surface 53 and the second locking surface 54 of the four-fold hinge are locked by fasteners 17 or similar locking elements.

The four-fold hinge used allows the two locking surfaces to expose outside the side panels when in a completely unfolded state, when the foldable side plates need to be locked or unlocked, an operator can perform operations directly on the exposed inner surfaces of the side panels without the need of turning around the side plates, thus enhancing the efficiency and simplifying the operation. Moreover, since the side plates are generally thin, the inner walls of the side plates contacting each other when in a completely unfolded state have very limited space to hold the first and second fixing surfaces of the four-fold hinge. Fixing the first and second fixing surfaces of the four-fold hinge on the inner walls of the side plates avoids any locking or unlocking operation on the narrow inner walls of the side plates, thus preventing the folded portions from cracking caused by frequently locking or unlocking operation and prolonging the service life of the pet house.

The opening 122 is provided on the second side panel 12 or the fourth side panel 14, a bottom of the opening 122 is higher than bottoms of the second side panel 12 and the fourth side panel 14, and the bottoms of the first side panel 11 and the third side panel 13 are configured to be flush with the bottom of the opening 122.

Embodiment 6

On a fourth aspect, the present disclosure provides a foldable pet house which differs from that of any embodiment above in that either or both of the second side panel 12 and the fourth side panel 14 are foldable. The second side panel 12 and/or the fourth side panel 14 include(s) a plurality of side plates 121/141 that are connected by at least one rotating connector 5.

The specific embodiments of the present disclosure are described above. It should be understood that the present disclosure is not limited to the above specific implementations, and a person skilled in the art can make various variations or modifications within the scope of the claims without affecting the essence of the present disclosure.

What is claimed is:

1. A foldable pet house, comprising
    a frame composed of a first side panel, a second side panel, a third side panel, and a fourth side panel connected end to end, wherein the first side panel and the third side panel are foldable and opposite to each other, and the second side panel and the fourth side panel are not foldable and opposite to each other;
    a top cover connected at a top of the frame; and
    a bottom panel connected at a bottom of the frame;
    wherein a positioning assembly is provided between the top cover and the top of the frame to limit a relative movement between the frame and the top cover;
    the positioning assembly comprises a first positioning convex column and a first positioning groove;
    a top surface of each of the first side panel and the third side panel is provided with the first positioning convex column, and a bottom surface of the top cover is provided with the first positioning groove aligned and matched with the first positioning convex column; or a top surface of each of the first side panel and the third side panel is provided with the first positioning groove, and a bottom surface of the top cover is provided with the first positioning convex column aligned and matched with the first positioning groove;
    the first positioning groove is a strip groove extending parallel to a length direction of the first side panel or the third side panel, a length of the strip groove is greater than a diameter of the first positioning convex column, and a width of the strip groove is equivalent to the diameter of the first positioning convex column.

2. The foldable pet house according to claim 1, wherein each of the first side panel and the third side panel comprises a plurality of side plates, adjacent side plates of the plurality of side plates are connected by at least one rotating connector, and the bottom panel is supported on an inner side of the bottom of the frame to position a lower part of the frame.

3. The foldable pet house according to claim 2, wherein the at least one rotating connector is a two-fold hinge, a four-fold hinge, or a combination of the two-fold hinge and the four-fold hinge.

4. A foldable pet house, comprising
a frame composed of a first side panel, a second side panel, a third side panel, and a fourth side panel connected end to end, wherein the first side panel and the third side panel are foldable and opposite to each other, and the second side panel and the fourth side panel are not foldable and opposite to each other;
a top cover connected at a top of the frame; and
a bottom panel connected at a bottom of the frame;
wherein a positioning assembly is provided between the top cover and the top of the frame to limit a relative movement between the frame and the top cover;
the positioning assembly comprises a first positioning convex column, a second positioning convex column, a first positioning groove, and a second positioning groove; and
the second side panel or the fourth side panel is provided with the second positioning convex column and a bottom surface of the top cover is provided with the second positioning groove aligned and matched with the second positioning convex column, or the second side panel or the fourth side panel is provided with the second positioning groove and a bottom surface of the top cover is provided with the second positioning convex column aligned and matched with the second positioning groove.

5. The foldable pet house according to claim 2, wherein each of the adjacent side plates is provided with a notch groove, and two notch grooves on the adjacent side plates form an open groove for a hand to hold the frame.

6. The foldable pet house according to claim 1, wherein the top cover is connected to a top surface of the second side panel or the fourth side panel through a flipping connector.

* * * * *